(12) United States Patent
Ruiz et al.

(10) Patent No.: US 8,554,042 B2
(45) Date of Patent: Oct. 8, 2013

(54) OPTICAL FIBER MANAGEMENT SHELF INCLUDING DOOR WITH PUSH-PUSH FASTENER

(75) Inventors: Gil Ruiz, McKinney, TX (US); Wade James Womack, Allen, TX (US)

(73) Assignee: CommScope, Inc., Hickory, NC (US)

( * ) Notice: Subject to any disclaimer, the term of this patent is extended or adjusted under 35 U.S.C. 154(b) by 582 days.

(21) Appl. No.: 12/707,476

(22) Filed: Feb. 17, 2010

(65) Prior Publication Data

US 2010/0209065 A1 Aug. 19, 2010

Related U.S. Application Data

(60) Provisional application No. 61/153,611, filed on Feb. 18, 2009, provisional application No. 61/153,615, filed on Feb. 18, 2009, provisional application No. 61/153,617, filed on Feb. 18, 2009.

(51) Int. Cl.
*G02B 6/00* (2006.01)
*G02B 6/36* (2006.01)

(52) U.S. Cl.
USPC .......................................... 385/135; 385/192

(58) Field of Classification Search
USPC .................................... 384/135, 92
See application file for complete search history.

(56) References Cited

U.S. PATENT DOCUMENTS

| | | | |
|---|---|---|---|
| 4,655,489 A | 4/1987 | Bisbing | |
| 5,689,605 A | 11/1997 | Cobb | |
| 5,734,770 A * | 3/1998 | Carpenter et al. | 385/72 |
| 5,778,130 A * | 7/1998 | Walters et al. | 385/134 |
| 5,806,140 A * | 9/1998 | Carlson et al. | 16/2.1 |
| 5,884,002 A * | 3/1999 | Cloud et al. | 385/135 |
| 5,884,003 A * | 3/1999 | Cloud et al. | 385/135 |
| 5,898,129 A * | 4/1999 | Ott et al. | 174/59 |
| 5,945,633 A * | 8/1999 | Ott et al. | 174/59 |
| 6,130,822 A * | 10/2000 | Della Fiora et al. | 361/724 |
| 6,353,183 B1 * | 3/2002 | Ott et al. | 174/59 |
| 6,427,045 B1 * | 7/2002 | Matthes et al. | 385/135 |
| 6,595,605 B1 * | 7/2003 | Babcock et al. | 312/223.2 |
| 7,799,995 B2 * | 9/2010 | Mullaney et al. | 174/77 R |
| 2003/0103334 A1 * | 6/2003 | Yun | 361/724 |
| 2003/0174434 A1 * | 9/2003 | Hoelsaeter et al. | 360/92 |
| 2004/0099773 A1 | 5/2004 | Sono | |
| 2004/0151465 A1 * | 8/2004 | Krampotich et al. | 385/136 |
| 2004/0240827 A1 * | 12/2004 | Daoud et al. | 385/135 |

(Continued)

FOREIGN PATENT DOCUMENTS

JP 2001141959 A * 5/2001

*Primary Examiner* — Kaveh Kianni
(74) *Attorney, Agent, or Firm* — Muncy, Geissler, Olds & Lowe PLLC

(57) ABSTRACT

An optical fiber management shelf includes a housing having a first opening and a fiber optic termination module mounted to the fiber management shelf. A first door is pivotably mounted on the housing and pivotable about an axis from a first position substantially covering the first opening to a second position allowing access to the first opening. A first projection is on the first door, and a first receiver is on the housing configured to receive and selectively retain the first projection to releasably secure the first door to the housing. The first receiver includes a latch configured to retain the first projection when the first projection is initially inserted or pushed into the first receiver. The first receiver is also configured to release the first projection when the first projection is subsequently pressed or pushed toward the first receiver after the initial insertion into the first receiver.

15 Claims, 2 Drawing Sheets

(56) References Cited

U.S. PATENT DOCUMENTS

| | | | |
|---|---|---|---|
| 2004/0251148 A1* | 12/2004 | Bernhard | 206/242 |
| 2006/0008235 A1* | 1/2006 | Krampotich et al. | 385/136 |
| 2006/0098932 A1* | 5/2006 | Battey et al. | 385/135 |
| 2007/0047895 A1* | 3/2007 | Parikh et al. | 385/135 |
| 2007/0189691 A1* | 8/2007 | Barth et al. | 385/135 |
| 2007/0274645 A1 | 11/2007 | Murano | |
| 2008/0084145 A1* | 4/2008 | Fromme et al. | 312/217 |
| 2008/0169116 A1* | 7/2008 | Mullaney et al. | 174/92 |
| 2008/0170832 A1* | 7/2008 | Mullaney et al. | 385/135 |
| 2009/0058018 A1* | 3/2009 | Mullaney et al. | 277/625 |
| 2009/0067800 A1* | 3/2009 | Vazquez et al. | 385/135 |
| 2009/0257726 A1* | 10/2009 | Redmann et al. | 385/135 |

* cited by examiner

OPTICAL FIBER MANAGEMENT SHELF INCLUDING DOOR WITH PUSH-PUSH FASTENER

CROSS-REFERENCE TO RELATED APPLICATIONS

The present application claims the benefit of U.S. Provisional Patent Applications Nos. 61/153,611, 61/153,615 and 61/153,617, each filed Feb. 18, 2009, the entire contents of which are hereby incorporated by reference.

FIELD OF THE INVENTION

The present invention is directed to a fiber management shelf having at least one door with a latch that can be secured and released using one hand, and, more specifically, toward a fiber management shelf having at least one door provided with at least one push-push fastener to allow the door to be secured and released using one hand.

BACKGROUND OF THE INVENTION

Data centers that support one or more businesses, factories or residential areas typically comprise one or more racks or cabinets filled with interconnection sites for optical fibers and fiber optic cables. In a typical installation, fiber optic cables that include multiple optical fibers from an external source (these are often known as "outside plant" or "OSP" fibers) enter the cabinet and are spliced together with individual optical fibers known as "pigtails." Splicing typically occurs in a splice tray or similar component that includes multiple splice sites. The pigtail fibers are then connected within the cabinet to standard termination sites. The termination sites include termination ports that connect optically with "jumper" optical fibers that exit the rack or cabinet to supply data or other information in optical form to the remainder of the building or site. The termination sites can be provided in a number of forms, including fiber distribution cartridges, fiber distribution modules, multi-position adapter couplers and/or bezels.

Fiber management shelves are often provided a front door for providing selective access to the termination sites and elements near the front of the shelf and/or a rear door providing selective access to the splice panel and elements at the rear of the shelf. These doors may be opened and closed as needed. However, in some cases, the doors are provided with latches or other mechanisms that must be manipulated with one or both hands in order to open the doors and/or fasten them securely. These latches can add to the complexity of fiber management shelves, and the latches on one fiber management shelf may interfere with the operation of the doors of adjacent fiber management shelves when the shelves are arranged one above another in a rack. Other types of latches may require a significant amount of force to release, and thus a user might have to pull forcefully on the door equipped with such a latch, possibly jarring the shelf and affecting the operation of the sensitive fiber optic components contained therein. It is also possible to provide fiber management shelves with doors that do not include latches, but this can lead to the undesirable condition of the doors coming open at unwanted times and failing to provide projection for the components they are intended to cover. It would therefore be desirable to provide a fiber management shelf with latchable doors that can be latched and unlatched with one hand, without pulling on the shelf, and that do not interfere with the operation of the doors of adjacent fiber management shelves stacked above or below the fiber management shelf equipped with such latches.

SUMMARY OF THE INVENTION

These problems and other are addressed by the present invention, a first aspect of which comprises an optical fiber management shelf that includes a housing having a first opening, a fiber optic termination module mounted in the fiber management shelf, a first door pivotably mounted on the housing and movable from a first position substantially covering the first opening to a second position allowing access to the first opening, and at least one push-push fastener releasably securing a first portion of the first door to the housing.

Another aspect of the invention comprises an optical fiber management shelf that includes a housing having a first opening, a fiber optic termination module mounted in the fiber management shelf and a first door pivotably mounted on the housing and pivotable about an axis from a first position substantially covering the first opening to a second position allowing access to the first opening. The first door includes a first projection, and there is a first receiver on the housing configured to receive and selectively retain the first projection to releasably secure the first door to the housing. The first receiver includes a latch configured to retain the first projection when the first projection is inserted into the first receiver and configured to release the first projection when the first door, while the first projection is retained in the first receiver, is pressed toward the first receiver.

A further aspect of the present invention comprises an optical fiber management shelf that includes a housing having a first opening on a first side of the housing and a second opening on a second side of the housing opposite from the first side of the housing with a fiber optic termination module mounted in the first opening and a fiber optic splice panel mounted in the second opening. A first door is pivotably mounted on the housing and is movable from a first position substantially covering the first fiber optic termination module to a second position allowing access to the fiber optic termination module, and a second door is pivotably mounted on the housing and is movable from a first position substantially covering the splice panel to a second position allowing access to the splice panel. The first door includes a first projection and a second projection and the second door includes a third projection and a fourth projection. The housing includes a first receiver and a second receiver configured to receive and selectively retain the first projection and the second projection to releasably secure the first door to the housing. The first receiver and second receiver each include a latch configured to retain the first projection and the second projection, respectively, when the first projection is inserted into the first receiver and the second projection is inserted into the second receiver and configured to release the first projection and the second projection when the first door, while the first projection and second projection are retained by the first receiver and the second receiver, respectively, is pressed toward the housing. The first door is sufficiently rigid that pressing the first door toward the housing at a point between the first projection and the second projection when the first projection is retained in the first receiver and the second projection is retained in the second receiver releases the first projection from the first receiver and releases the second projection from the second receiver. The second door is sufficiently rigid that pressing the second door toward the housing at a point between the third projection and the fourth projection when the third projection is retained in the third receiver and the fourth projection is retained in the fourth receiver releases the third projection from the third receiver and releases the fourth projection from the fourth receiver. The first opening includes a bottom edge and a top edge, the first door includes a bottom edge pivotably mounted at the first opening bottom edge, and the first projection and the second projection are located on the first door at a location closer to the first door top edge than to the first door bottom edge. The second opening includes a bottom edge and a top edge, the second door includes a bottom edge pivotably mounted at the second opening bottom edge, and the third projection and the fourth projection are located on the second door at a location closer to the second door top edge than to the second door bottom edge. The first projection and the second projection are integrally molded with the first door and the third projection and the fourth projection are integrally molded with the second door.

BRIEF DESCRIPTION OF THE DRAWINGS

These and other aspects of embodiments of the present invention will be better understood after a reading of the following detailed description, together with the attached drawings, wherein.

DETAILED DESCRIPTION

Figure 1:
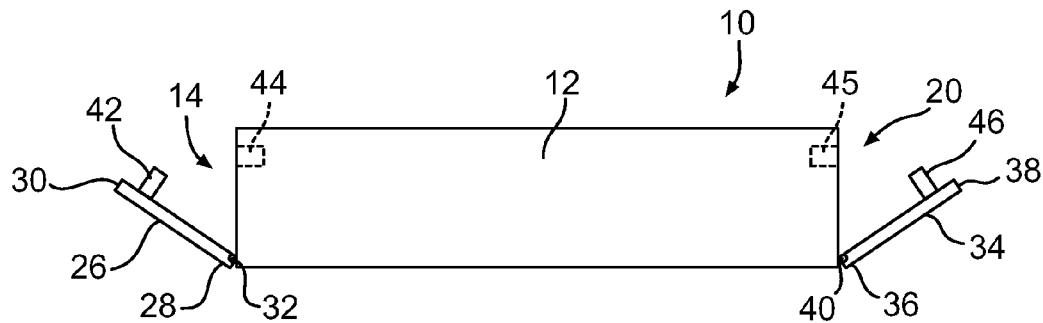
FIG. 1 is a side elevational view of an optical fiber management shelf having front and rear doors with push-push fasteners according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
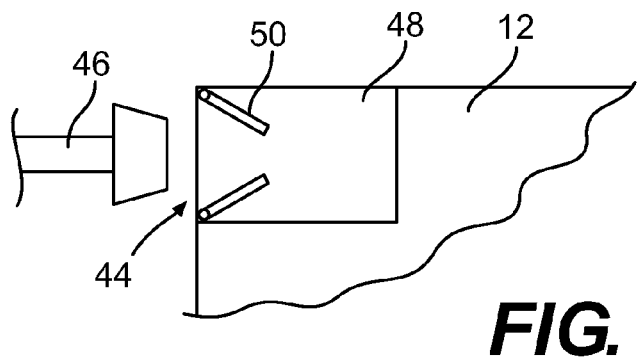
FIG. 4 is an enlarged elevational view, partly in section of the push-push fastener of FIG. 1.

FIG. 1 illustrates a fiber management shelf 10 comprising a housing 12 having a front opening 14 having a bottom edge 16 and a top edge 18 and a rear opening 20 having a bottom edge 22 and a top edge 24. As used herein, "housing" refers to the elements surrounding a plurality of fiber optic components and may comprise the floor of a fiber optic management shelf, the side walls of the fiber optic management shelf or a rack (not illustrated) in which the shelf is mounted, and/or a top wall that may be formed by another element mounted above the fiber optic management shelf in a rack. The housing may also be defined at least in part by one or more fiber retainer rings mounted near either side of the door at the front of a fiber management shelf. A first or front door 26 has a bottom edge 28 and a top edge 30, and bottom edge 28 of front door 26 is connected near bottom edge 16 of front opening 14 by a plurality of hinges 32. A second or rear door 34 has a bottom edge 36 and a top edge 38, and bottom edge 36 of rear door 34 is connected near bottom edge 22 of rear opening 20 by a plurality of hinges 40. Front door 26 includes first and second projections 42 closer to top edge 30 than to bottom edge 28 which projections are configured to be releasably retained within first and second receivers 44 near top edge 18 of front opening 14, and rear door 34 includes third and fourth projections 46 closer to rear door top edge 38 than to rear door bottom edge 36 which projections are configured to be releasably retained within third and fourth receivers 48 near top edge 24 of rear opening 20. As illustrated in FIG. 4, first and second receivers 44 include a latch element 50 for selectively retaining first and second projections 42. Third and fourth receivers 48 include similar latch elements (not illustrated).

First projection 42 and first receiver 44 form a push-push connector or push-push fastener. As used herein, a "push-push" fastener is a fastener that selectively secures a relatively movable object, such as a door, to a relatively fixed object, such as a housing. The push-push fasteners are secured by pressing a fastener element on the moveable object against a fastener element on the fixed element, which pressing results in a connection between the fastener elements. The push-push fasteners are released by again pressing the movable object toward the fixed element, which pushing releases the fastener element on the movable object from the fastener element on the fixed element and allows the movable element to move. One such push-push fastener is disclosed in U.S. Pat. No. 4,655,489 to Bisbing, and the entire contents of this patent are hereby incorporated by reference. Other push-push fasteners are known, and the present invention is not limited to a particular push-push fastener.

Figure 2:
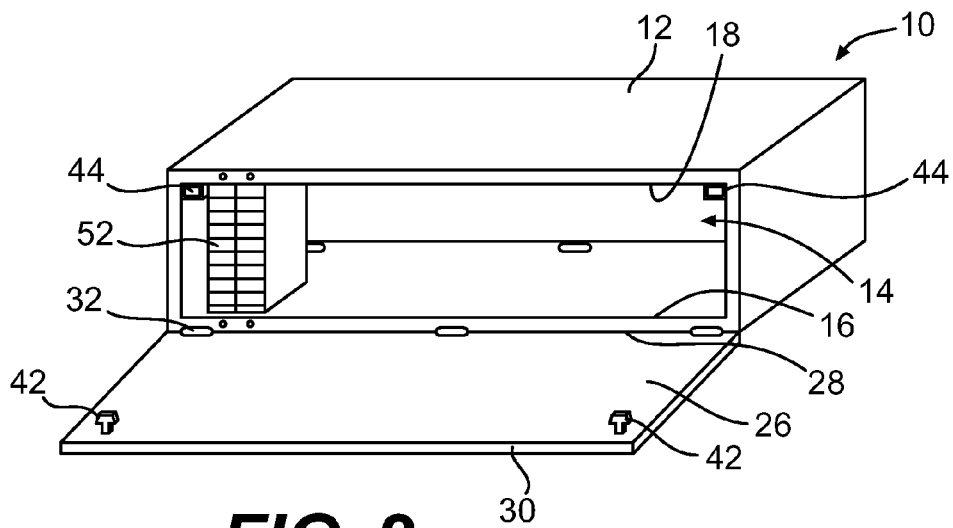
FIG. 2 is a front perspective view of the optical fiber management shelf of FIG. 1.

FIG. 2 illustrates front door 26 in an open configuration, providing access to fiber termination elements 52 mounted in front opening 14. Only two fiber termination elements 52 are illustrated in FIG. 2; however, in many cases, a sufficient number of fiber termination elements 52 would be provided to fill front opening 14. To cover front opening 14, front door 26 is pivoted about hinges 32 until first and second projections 42 approach first and second receivers 44 and then enter the first and second receiver 44. Continued movement of front door 26 toward housing 12 causes latch elements 50 in first and second receivers 44 to engage first and second projections 42 and retain the first and second projections 42 in the receivers 44 and thus hold front door 26 securely in a closed position with top edge 30 of front door 26 close to the top edge 18 of the front opening.

Figure 3:
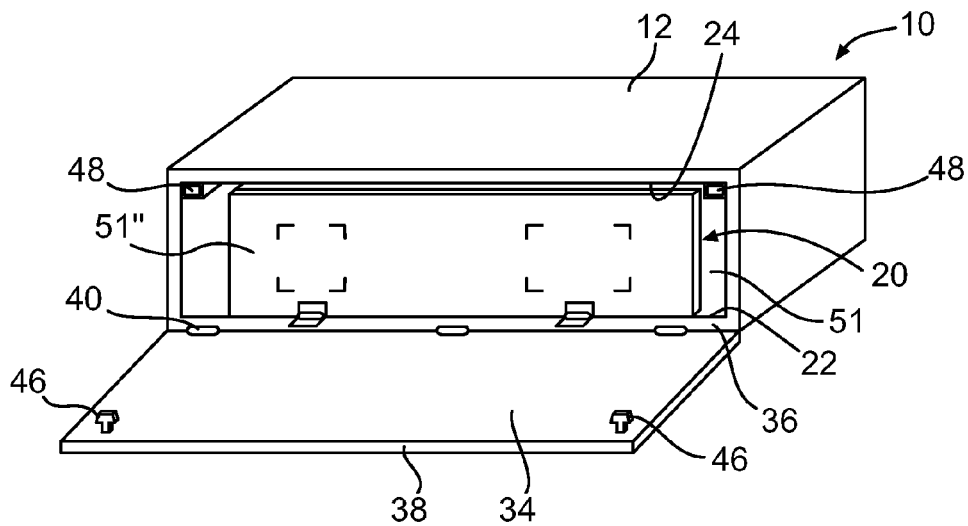
FIG. 3 is a rear perspective view of the optical fiber management shelf of FIG. 1.

To open front door 26 and gain access to the fiber termination elements 52 in front opening 14, pressure is applied against front door 26 near top edge 30 thereof between the first and second projections 42. Front door 26 is sufficiently rigid that this pressing simultaneously moves both the first and second projections 42 further into first and second receivers 44 to release latch element 50 in the first and second receivers 44 from first and second projections 42 and allow front door 26 to pivot about hinges 32 and to the open position illustrated in FIG. 3. Thus front door 26 can be opened and closed with one hand without the need to apply any pulling force on the front door 26 or on the fiber management shelf 10. Rear door 34 selectively covers rear opening 20 and splice panel 51 located therein, as illustrated in FIG. 3, and is secured and released in a manner similar to that of front door 26.

Figure 5:
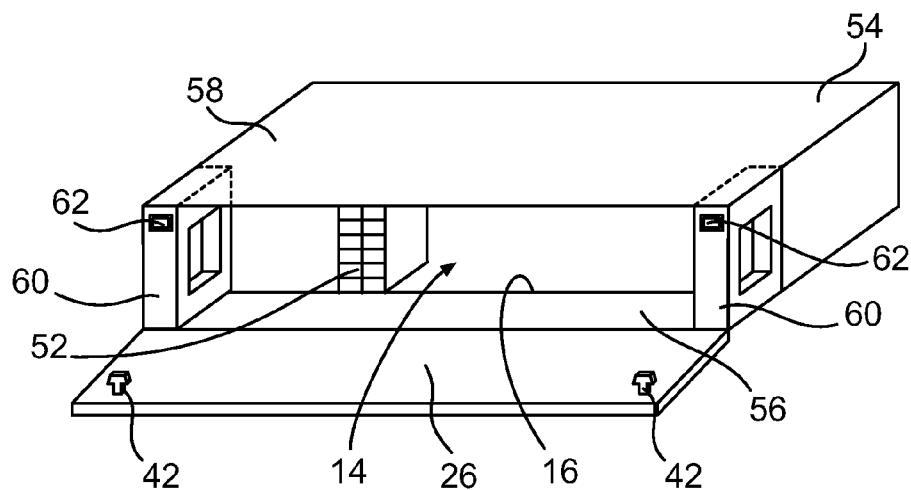
FIG. 5 is a front perspective view of an optical fiber management shelf according to a second embodiment of the present invention.

A second embodiment of the present invention is illustrated in FIG. 5 in which a housing 54 includes first and second spaced wall portions 56, 58 projecting from a front thereof and first and second fiber retainer rings 60 at opposite sides of the housing 54 between the first and second spaced wall portions 56, 58. Fiber retainer rings 60 are provided to help guide patch cables (not illustrated) as they exit fiber termination elements 52. Each fiber retainer ring 60 includes a receiver 62 for receiving and securing first and second projections 42 on front door 26 in the same manner as the first and second receivers 44 described above. Fiber retainer rings 60 are secured to housing 54 and thus providing receivers 62 on these fiber retainer rings 60 provides a secure connection between front door 26 and housing 54 while at the same time providing space between fiber termination elements 52 and front door 26 for the patch cables.

Figure 6:
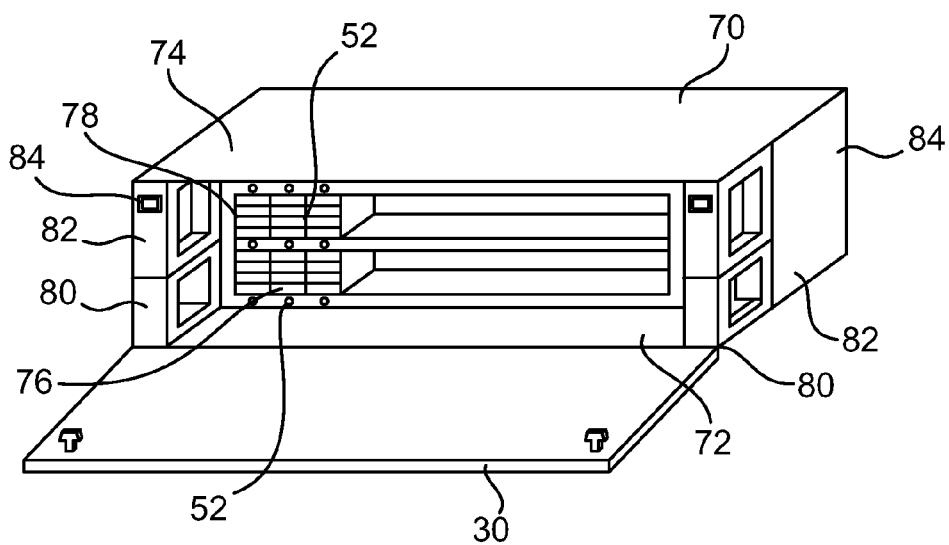
FIG. 6 is a front perspective view of an optical fiber management shelf according to a third embodiment of the present invention.

A third embodiment of the present invention is illustrated in FIG. 6 in which a housing 70 includes lower and upper spaced wall portions 72, 74 projecting from a front thereof, and a first row 76 of fiber termination elements 52 and a second row 78 of fiber termination elements 52 mounted in housing 70. First and second fiber retainer rings 80 are provided on lower wall portion 72 for guiding patch cables leaving the fiber termination elements of the first row 76 of fiber termination elements 52, and third and fourth fiber retainer rings 82 are stacked on each of the first and second fiber retainer rings 80 for guiding patch cables of the second row 78 of fiber termination elements 52. Each of the third and fourth fiber retainer rings 82 includes a receiver 84 identical to the first and second receivers 44 of the first embodiment for receiving first and second projections 42 of front door 26 and securing front door 26 to third and fourth retainer rings 82 and thus to housing 70.

The present invention has been described in terms of several presently preferred embodiments. However, additions and modifications to these embodiments will become apparent to those of ordinary skill in the relevant art upon a reading of the foregoing description. It is intended that all such additions and modifications form a part of the present invention to the extent they fall within the scope of the several claims appended hereto.

We claim:
1. An optical fiber management shelf comprising:
a housing having a first opening;
a fiber optic termination module mounted in said fiber management shelf;
a first door pivotably mounted on said housing and pivotable about an axis from a first position substantially covering said first opening to a second position allowing access to said first opening;
a first projection on said first door; and
a first receiver on said housing configured to receive and selectively retain said first projection to releasably secure said first door to said housing, said first receiver including a latch configured to retain said first projection when said first projection is inserted into said first receiver and configured to release said first projection when said first door, while said first projection is retained in said first receiver, is pressed toward said first receiver,
wherein said fiber optic termination module is mounted in said first opening and selectively covered by said first door and including a second opening, an optical fiber splice panel mounted in said second opening and a second door pivotably mounted on said housing and movable from a first position substantially covering said second opening to a second position allowing access to said second opening, said second door including a second projection and said housing including a second receiver configured to receive and selectively retain said second projection to releasably secure said second door to said housing, said second receiver including a latch configured to retain said second projection when said second projection is inserted into said second receiver and configured to release said second projection when said second door, while said second projection is retained by said second receiver, is pressed toward said second receiver.

2. The optical fiber management shelf of claim 1 wherein said first projection and said first receiver comprises a first push-push fastener.

3. The optical fiber management shelf of claim 1 wherein said first door includes a third projection spaced from said first projection and said housing includes a third receiver spaced from said first receiver and configured to receive and selectively retain said third projection, said third receiver including a latch configured to retain said third projection when said third projection is inserted into said third receiver and configured to release said third projection when said first door, while said first and third projections are retained in said first and third receivers, is pressed toward said first and third receivers.

4. The optical fiber management shelf of claim 3 wherein said first door is sufficiently rigid that pressing said first door toward said housing at a point between said first projection and said third projection when said first projection is retained in said first receiver and said third projection is retained in said third receiver releases said first projection from said first receiver and releases said third projection from said third receiver.

5. The optical fiber management shelf of claim 1, wherein said first opening includes a bottom edge and a top edge, said first door includes a bottom edge pivotably mounted at said first opening bottom edge and said first projection is located on said first door at a location closer to said first door top edge than to said first door bottom edge.

6. The optical fiber management shelf of claim 1 wherein said first projection is integrally molded with said door.

7. The optical fiber management shelf of claim 1 wherein said housing comprises an optical fiber retaining ring adjacent to said first opening and wherein said first receiver is located on said optical fiber retaining ring.

8. The optical fiber management shelf of claim 1 wherein said housing comprises a first optical fiber retaining ring adjacent to said first opening and a second optical fiber retaining ring stacked on said first optical fiber retaining ring, wherein said first receiver is located on said second optical fiber retaining ring.

9. An optical fiber management shelf comprising:
a housing having a first opening;
a fiber optic termination module mounted in said fiber management shelf;
a first door pivotably mounted on said housing and pivotable about an axis from a first position substantially covering said first opening to a second position allowing access to said first opening;
a first projection on said first door; and
a first receiver on said housing configured to receive and selectively retain said first projection to releasably secure said first door to said housing, said first receiver including a latch configured to retain said first projection when said first projection is inserted into said first receiver and configured to release said first projection when said first door, while said first projection is retained in said first receiver, is pressed toward said first receiver,
wherein said fiber optic termination module is mounted in said first opening and selectively covered by said first door;
wherein said first door includes a second projection spaced from said first projection and said housing includes a second receiver spaced from said first receiver and configured to receive and selectively retain said second projection, said second receiver including a latch configured to retain said second projection when said second projection is inserted into said second receiver and configured to release said second projection when said first door, while said second projection is retained by said second receiver, is pressed toward said second receiver;
wherein said optical fiber management shelf includes a second opening, an optical fiber splice panel mounted in said second opening and a second door pivotably mounted on said housing and movable from a first position substantially covering said second opening to a second position allowing access to said second opening,
wherein said second door includes a third projection and a fourth projection spaced from said third projection, and
wherein said housing includes a third receiver and a fourth receiver spaced from said third receiver, said third receiver being configured to receive and selectively retain said third projection, said third receiver including a latch configured to retain said third projection when said third projection is inserted into said third receiver and configured to release said third projection when said second door, while said third projection is retained by said third receiver, is pressed toward said third receiver and said fourth receiver being configured to receive and selectively retain said fourth projection, said fourth receiver including a latch configured to retain said fourth projection when said fourth projection is inserted into said fourth receiver and configured to release said fourth projection when said second door, while said fourth projection is retained in said fourth receiver, is pressed toward said fourth receiver.

10. The optical fiber management shelf according to claim 9 wherein said first door is sufficiently rigid that pressing said first door toward said housing at a point between said first projection and said second projection when said first projection is retained in said first receiver and said second projection is retained in said second receiver releases said first projection from said first receiver and releases said second projection from said second receiver, and said second door is sufficiently rigid that pressing said second door toward said housing at a point between said third projection and said fourth projection when said third projection is retained in said third receiver and said fourth projection is retained in said fourth receiver releases said third projection from said third receiver and releases said fourth projection from said fourth receiver.

11. The optical fiber management shelf of claim 10 wherein said first opening includes a bottom edge and a top edge, said first door includes a bottom edge pivotably mounted at said first opening bottom edge and said first projection and said second projection are located on said first door at a location closer to said first door top edge than to said first door bottom edge and said second opening includes a bottom edge and a top edge, said second door includes a bottom edge pivotably mounted at said second opening bottom edge and said third projection and said fourth projection are located on said second door at a location closer to said second door top edge than to said second door bottom edge.

12. The optical fiber management shelf of claim 11 wherein said first projection and said second projection are integrally molded with said first door and said third projection and said fourth projection are integrally molded with said second door.

13. An optical fiber management shelf comprising:
a housing having a first opening on a first side of said housing and a second opening on a second side of said housing opposite from said first side of said housing;
a fiber optic termination module mounted in said first opening;
a fiber optic splice panel mounted in said second opening;

a first door pivotably mounted on said housing and movable from a first position substantially covering said first fiber optic termination module to a second position allowing access to said fiber optic termination module;

a second door pivotably mounted on said housing and movable from a first position substantially covering said first splice panel to a second position allowing access to said splice panel;

a first projection and a second projection on said first door;

a third projection and a fourth projection on said second door;

a first receiver and a second receiver on said housing configured to receive and selectively retain said first projection and said second projection to releasably secure said first door to said housing, said first receiver and second receiver each including a latch configured to retain said first projection and said second projection, respectively, when said first projection is inserted into said first receiver and said second projection is inserted into said second receiver and configured to release said first projection and said second projection when said first door, while said first projection and second projection are retained by said first receiver and said second receiver, respectively, is pressed toward said housing, wherein said first door is sufficiently rigid that pressing said first door toward said housing at a point between said first projection and said second projection when said first projection is retained in said first receiver and said second projection is retained in said second receiver releases said first projection from said first receiver and releases said second projection from said second receiver, and said second door is sufficiently rigid that pressing said second door toward said housing at a point between said third projection and said fourth projection when said third projection is retained in said third receiver and said fourth projection is retained in said fourth receiver releases said third projection from said third receiver and releases said fourth projection from said fourth receiver, wherein said first opening includes a bottom edge and a top edge, said first door includes a bottom edge pivotably mounted at said first opening bottom edge and said first projection and said second projection are located on said first door at a location closer to said first door top edge than to said first door bottom edge, and said second opening includes a bottom edge and a top edge, said second door includes a bottom edge pivotably mounted at said second opening bottom edge and said third projection and said fourth projection are located on said second door at a location closer to said second door top edge than to said second door bottom edge, and wherein said first projection and said second projection are integrally molded with said first door and said third projection and said fourth projection are integrally molded with said second door.

14. The optical fiber management shelf according to claim 13 wherein said housing comprises an optical fiber retaining ring adjacent to said opening and wherein said first receiver is located on said optical fiber retaining ring.

15. The optical fiber management shelf according to claim 14 wherein said first projection and first receiver comprises a first push-push fastener, said second projection and second receiver comprises a second push-push fastener, said third projection and third receiver comprises a third push-push fastener and said fourth projection and fourth receiver comprises a fourth push-push fastener.

* * * * *